United States Patent [19]

Petroff

[11] 3,925,721
[45] Dec. 9, 1975

[54] PROCESSED SEWAGE EFFLUENT
[76] Inventor: Peter D. Petroff, 4102 Piedmont Drive SE., Huntsville, Ala. 35802
[22] Filed: Nov. 29, 1974
[21] Appl. No.: 528,451

[52] U.S. Cl.................................. 324/.5 R; 210/2
[51] Int. Cl.² ........................................ G01R 33/08
[58] Field of Search................... 324/.5 R; 210/2, 10

[56] References Cited
OTHER PUBLICATIONS
J. H. Allen et al., "Nuclear Magnetic Double Resonance Apparatus for Chemical Shift Measurements on 13C," Journal Sci Instruments, 1964, Vol. 41.

Primary Examiner—Alfred E. Smith
Assistant Examiner—Michael J. Tokar

[57] ABSTRACT

A continuous method and means for the measurement of biological oxygen demand in an effluent in which a sample flow of the effluent is continuously fed through a nuclear resonator operated for the detection of carbon 13, or hydrogen in conjunction with carbon 13. The detected quantity is then converted to a known companion level of carbon 12, and from this the amount of biological oxygen demand is indicated.

11 Claims, 1 Drawing Figure

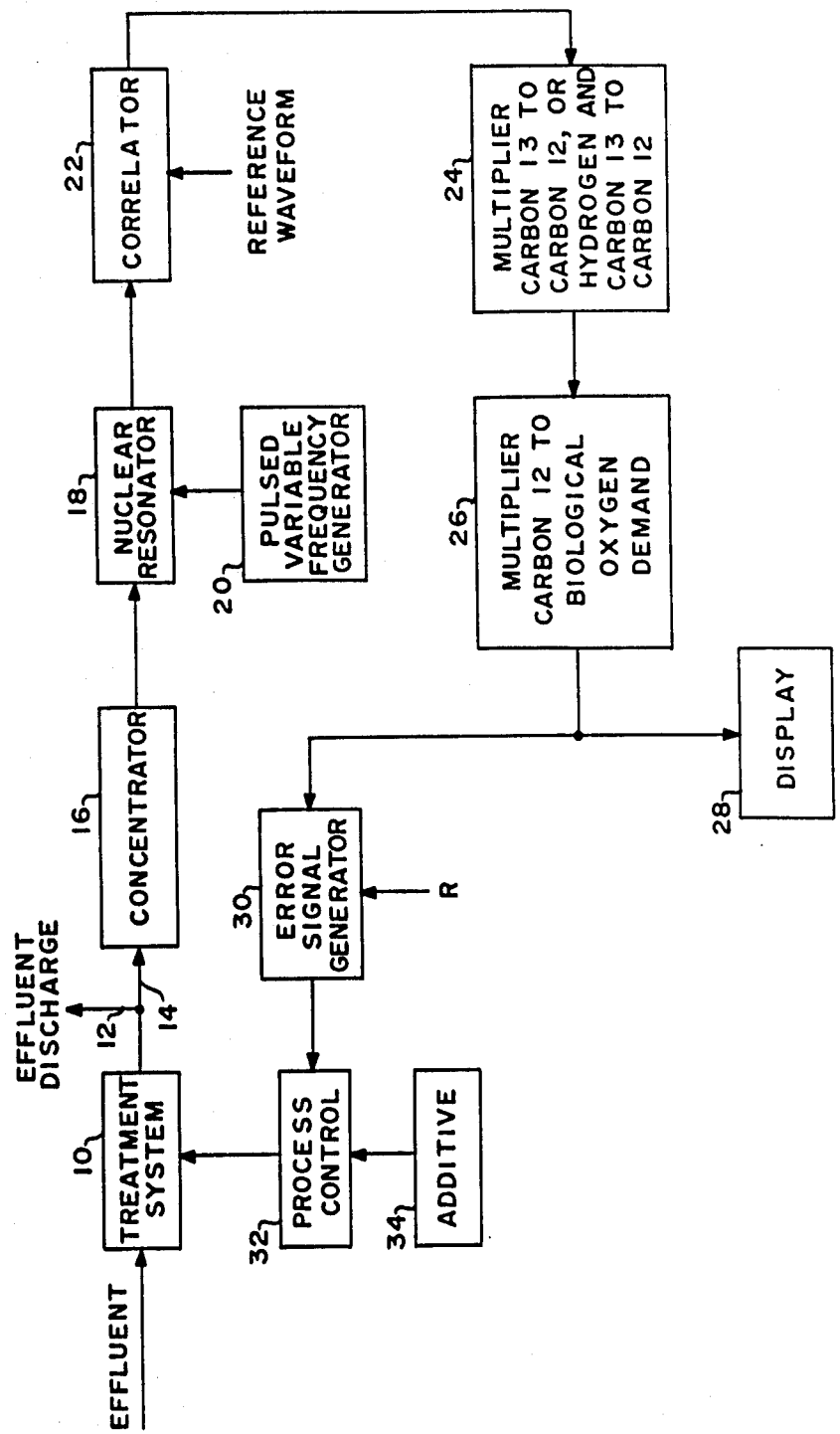

PROCESSED SEWAGE EFFLUENT

BACKGROUND OF THE INVENTION

1. Field of the Invention

This invention relates to sewage control and measurement, and particularly to a method and means of determining the magnitude of biological oxygen demand in the effluent.

2. General Description of the Prior Art

Improvement of the quality of our lakes and streams is a matter of urgency. In recognition of this, the government has imposed very rigid standards on permissible limits of certain characteristics of processed sewage to be dumped into waterways. One of these, biological oxygen demand of the effluent, must be reduced to 30 milliliters per liter effective June, 1977. At the present time, the applicant is unaware of any system which will, on a continuous basis, and without significant delay, provide means of measurement of this characteristic and its magnitude. As far as is known, the technique presently being employed requires approximately 5 days to perform a single measurement, requiring incubation of the sample for this period. Further, the technique is one normally requiring laboratory facilities and is not readily adaptable to be performed in the field, such as at the site of a sewage treatment plant.

It is, accordingly, an object of this invention to accomplish what has not been previously done, to-wit, a method and means of measurement on a rapid and continuous basis of effluent, thus enabling immediate and effective control of the content of the effluent to be within established permissible limits.

SUMMARY OF THE INVENTION

A sample of the effluent to be monitored is subjected to a strong magnetic field including a selectable radio frequency field. Changes in field strength verses frequency components of the field are detected as they relate to the presence of carbon 13, by itself or from a hydrogen in conjunction with carbon 13. The resulting measured pattern, or waveform, is compared, correlated with a standard, and thereby the amount of carbon 13 determined. From this the quantity of biological oxygen demand in the effluent is computed, indicated, stored and/or employed to condition the effluent as required to maintain the biological oxygen demand of the effluent to within permissible limits.

BRIEF DESCRIPTION OF THE DRAWING

The drawing is a schematic illustrative of an embodiment of the invention.

DETAILED DESCRIPTION OF THE DRAWING

Referring to the drawing, raw sewage is fed to treatment system 10 which treats or conditions the effluent to meet certain standards before it may be discharged. A critical standard, which must be met before June, 1977, is that the biological oxygen demand of the effluent must not exceed 30 milliliters per liter.

The output of treatment system 10 is discharged through exhaust line 12 to a receiving stream, lake, or other body of water. A portion of this output is sampled on an essentially continuous basis through line 14 which provides an input to concentrator 16. Concentrator 16 is a known type device, such as a freeze dryer, and it functions to concentrate the effluent to 1/50 to 1/100 of its original volume. This apparatus and this step are desirable where the magnitude of carbon 13 in the effluent is to be directly detected as opposed to its indirect detection by detection of hydrogen in conjunction with carbon 13. This concentrating function provides a greater sensitivity for the measurement and may be omitted where hydrogen in conjunction with carbon 13 are being sensed.

The output of concentrator 16, the concentrated effluent, is fed to nuclear resonator 18. Nuclear resonator 18 contains means for producing in a test region both a stationary magnetic field and a radio frequency magnetic field, the latter being produced in response to an output from variable frequency generator 20 operating typically in the range of 20 to 220 megahertz. In order to provide high power frequency energy at selected frequencies, variable frequency generator 20 would typically be of the pulsed type wherein selected frequencies are produced over short periods of time at high power levels. Nuclear magnetic resonator 18 contains a magnetic pickup coupled to the magnetic field in the test region and provides an output indicative of the level of any disturbance of the field produced by virtue of substances in the concentrated sample flowing through the test region of resonator 18.

It has been found that carbon 13 produces a discrete combination of resonances or frequency-amplitude patterns when subjected to magnetic fields of nuclear magnetic resonator 18 which produce distinct distortions of the field in the test region. These are sensed by the magnetic pickup which provides an output to correlator 22 in the form of a frequency-amplitude waveform. Correlator 22 is also supplied a reference waveform indicative of the presence of a known quantity of carbon 13, or hydrogen in conjunction with carbon 13. Correlator 22 typically would be of the digital type in which input waveforms would be digitized and data points, or digits, of the two waveforms related in a conventional fashion to produce an indication of correlation between the waveforms. The output of correlator 22 is in the form of a quantity which varies in value proportional to the degree of correlation and magnitude of carbon 13, or hydrogen in conjunction with carbon 13, present.

The output of correlator 22 is fed to multiplier 24 which is adapted to perform a known multiplication to provide as an output the amount of carbon 12 present, or, as desired, convert a quantity of hydrogen in conjunction with carbon to a quantity of carbon 12 present. For example, it is known that where carbon 13 is present carbon 12 will also be present and in the ratio of 89.6–90.2 to 1. Where a particular hydrogen-carbon 13 compound is detected, it, too, can be utilized to determine the quantity of carbon 12 by means of a known multiplication factor inserted in multiplier 24.

The output of multiplier 24, indicative of a quantity of carbon 12 present, is fed to multiplier 26 where it is multiplied by a factor of 0.2 to 1, depending on the type of effluent, to provide as an output biological oxygen demand. This output is fed to indicator 28 which includes means for displaying and/or recording this quantity. The biological oxygen demand quantity is also fed to error signal generator 30 to which is also applied a reference value R representative of an acceptable level of biological oxygen demand. Error signal generator 30 then compares the two and provides an output to process control 32 indicative of any needed correction. Process control 32 then, responsive to this signal, meters an appropriate quantity of a corrective additive 34 and/or biological treatment to treatment system 10 to correct, lower, the level of biological oxygen demand in order that an output of treatment system 10 be at an accepted level for biological oxygen demand.

What is claimed is:

1. A system for the measurement of biological oxygen demand of an effluent comprising:
   sample means adapted to be coupled to an effluent line for providing a sample of the effluent;
   nuclear resonating means adapted to receive said sample and subjecting it to a magnetic field and for detecting the disturbance of that field by the sample and providing as an output an indication of the disturbance of that field;
   correlation means responsive to the output of said nuclear resonating means for comparing said output to a signal representative of the disturbance of said field by a sample containing a known substance representative of a known biological oxygen demand; and
   conversion means responsive to the output of said correlation means for indicating the level of biological oxygen demand in said sample.

2. A system as set forth in claim 1 wherein said sampling means includes means for providing a said sample to said nuclear resonator on a substantially continuous basis and said nuclear resonating means includes means for subjecting said sample to said magnetic field on a substantially continuous basis.

3. A system as set forth in claim 2 wherein said substance is hydrogen in conjunction with carbon 13.

4. A system as set forth in claim 2 wherein said substance is carbon 13 and said system further comprises fluid concentrating means responsive to the output of said sampling means for concentrating said sample of effluent before said sample is supplied to said nuclear resonating means.

5. A system as set forth in claim 4 wherein said concentrating means comprises means for concentrating said effluent by a factor of 50 to 100.

6. A system as set forth in claim 5 wherein said conversion means includes means for converting the level of oxygen 13 to carbon 12 and converting it to biological oxygen demand.

7. A system as set forth in claim 6 wherein said conversion means comprises means for converting carbon 12 to biological oxygen demand in terms of milliliters per liter.

8. A system as set forth in claim 1 further comprising:
   a source of additives adapted to be added to said effluent to adjust the level of biological oxygen demand in said effluent;
   process control means responsive to a control signal for supplying said additives to said effluent; and
   error signal means responsive to a reference signal and an output of said conversion means for providing a said control signal to said process control means representative of the excess in biological oxygen demand present, whereby a selected biological oxygen demand of effluent is not exceeded.

9. A method of measurement of biological oxygen demand of an effluent comprising the steps:
   a. applying the effluent to a nuclear generator and subjecting it to a magnetic field and detecting as an electrical quantity an output which is an indication of the disturbance of that field by the sample in the form of output level versus frequency;
   b. correlating the output of step (a) with a reference electrical characteristic representative of the disturbance of a said field by a sample containing a known substance representative of a known biological oxygen demand and providing and obtaining an output representative of the quantity of said substance in said sample; and
   c. converting the output of said correlation means to an indication of the level of biological oxygen demand of said sample.

10. A method as set forth in claim 9 wherein said substance is carbon 13 and the quantity of carbon 13 is converted to a companion quantity of carbon 12 and the quantity of carbon 12 is converted to biological oxygen demand.

11. A method as set forth in claim 9 wherein said substance is hydrogen in conjunction with carbon 13.

* * * * *